United States Patent
Agrawal et al.

(10) Patent No.: US 8,074,498 B2
(45) Date of Patent: *Dec. 13, 2011

(54) SYSTEM AND METHOD OF ASSESSING THERMAL ENERGY LEVELS OF A GAS TURBINE ENGINE COMPONENT

(75) Inventors: Rajendra K. Agrawal, S. Windsor, CT (US); Ravi Rajamani, West Hartford, CT (US); William F. Schneider, Cromwell, CT (US); Coy Bruce Wood, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/467,973

(22) Filed: May 18, 2009

(65) Prior Publication Data

US 2010/0288034 A1    Nov. 18, 2010

(51) Int. Cl.
*G01M 15/14*    (2006.01)
(52) U.S. Cl. .................................................. 73/112.01
(58) Field of Classification Search ............... 73/112.01, 73/112.03, 112.04–112.06
See application file for complete search history.

(56) References Cited

U.S. PATENT DOCUMENTS

| | | | |
|---|---|---|---|
| 3,513,692 A | 5/1970 | Slone | |
| 4,060,979 A | 12/1977 | Elsaesser et al. | |
| 4,227,369 A | 10/1980 | Williams | |
| 4,528,844 A | 7/1985 | Couch | |
| 4,888,948 A | 12/1989 | Fisher et al. | |
| 5,070,722 A | 12/1991 | Hawman et al. | |
| 5,445,027 A * | 8/1995 | Zorner | 73/593 |
| 5,622,045 A * | 4/1997 | Weimer et al. | 60/204 |
| 5,726,891 A | 3/1998 | Sisson et al. | |
| 6,487,909 B2 * | 12/2002 | Harrold et al. | 73/593 |
| 6,499,350 B1 * | 12/2002 | Board et al. | 73/660 |
| 6,513,333 B2 | 2/2003 | Sugitani | |
| 6,643,570 B2 * | 11/2003 | Bangert et al. | 701/29 |
| 6,668,655 B2 | 12/2003 | Harrold et al. | |
| 6,845,943 B2 | 1/2005 | Chambers et al. | |
| 2006/0047403 A1 * | 3/2006 | Volponi et al. | 701/100 |
| 2009/0014245 A1 * | 1/2009 | Shevchenko et al. | 184/6.4 |
| 2009/0112519 A1 * | 4/2009 | Novis et al. | 702/183 |
| 2010/0292905 A1 * | 11/2010 | Agrawal et al. | 701/100 |
| 2010/0313639 A1 * | 12/2010 | Khibnik et al. | 73/112.01 |

FOREIGN PATENT DOCUMENTS

WO            93/04365         8/1991

* cited by examiner

*Primary Examiner* — Freddie Kirkland, III
(74) *Attorney, Agent, or Firm* — Carlson, Gaskey & Olds, P.C.

(57) ABSTRACT

An example method of assessing a component of a gas turbine engine includes monitoring debris in at least a portion of an engine and establishing an estimated thermal energy level for a component of the engine based on the monitoring. The method may use gas path parameters to establish the estimated thermal energy level. An example gas turbine engine component assessment system includes a debris monitoring system configured to monitor debris moving through a portion of an engine and a controller programmed to execute an engine deterioration model that assesses a thermal energy level of at least one component of the engine based on information from the debris monitoring system.

20 Claims, 4 Drawing Sheets

SYSTEM AND METHOD OF ASSESSING THERMAL ENERGY LEVELS OF A GAS TURBINE ENGINE COMPONENT

BACKGROUND

This application relates generally to assessing a component of a gas turbine engine, and more particularly to estimating a thermal energy level of the component.

Gas turbine engines are known and typically include multiple sections, such as an inlet section, an inlet particle separation section, a fan section, a compression section, a combustor section, a turbine section, and an exhaust nozzle section. The fan section or the compression section moves air into the engine. The air is compressed as the air flows through the compression section. The compressed air is then mixed with fuel and combusted in the combustor section. Products of the combustion are expanded to rotatably drive the engine.

The gas turbine engine includes a plurality of components that operate in extremely high temperature environments. As known, absorbing excessive thermal energy from these environments can undesirably melt or otherwise damage the components. Accordingly, many gas turbine engines include cooling systems that are configured to limit the thermal energy absorbed by the components or to move thermal energy away from the components. Operating the engine wears and erodes the components, which can reduce the effectiveness of these cooling systems.

Additionally, some engines operate in sandy environments. Debris, like sand, moving through the engine can accelerate wear and erosion of the components. For example, one type of the cooling system moves air through film cooling holes established in the components. Air flows from the film cooling holes over the surfaces of the components to move thermal energy away from the component. Debris can block the flow of air from the cooling holes by lodging in the film cooling holes or glassifying over the film cooling holes. Blocking the cooling holes lessens the effectiveness of this type of cooling system and increases the thermal energy retained by these components resulting in increased metal temperatures which adversely effects the life of these components. The impact of the blocked flow of air from the film cooling holes on the component is often insidious. That is, detecting changes in the effectiveness of this type of cooling system prior to the part melting or otherwise becoming damaged is often difficult.

SUMMARY

An example method of assessing a component of a gas turbine engine includes monitoring debris in at least a portion of an engine and establishing an estimated thermal energy level for a component of the engine based on this monitoring. The method may use gas path parameters, such as pressures, temperatures, and speeds to establish the estimated thermal energy level.

Another example method of assessing components of a gas turbine engine includes monitoring airflow moving through a portion of an engine to detect a presence of debris carried by the airflow, determining a characteristic of the debris, and initiating a notification relating to an estimated temperature of a component of the engine based at least in part on the characteristic.

An example gas turbine engine component assessment system includes a debris monitoring system configured to monitor debris moving through a portion of an engine and a controller programmed to execute an engine deterioration model that assesses a thermal energy level of at least one component of the engine based on information from the debris monitoring system.

These and other features of the example disclosure can be best understood from the following specification and drawings, the following of which is a brief description.

DETAILED DESCRIPTION

Figure 1:
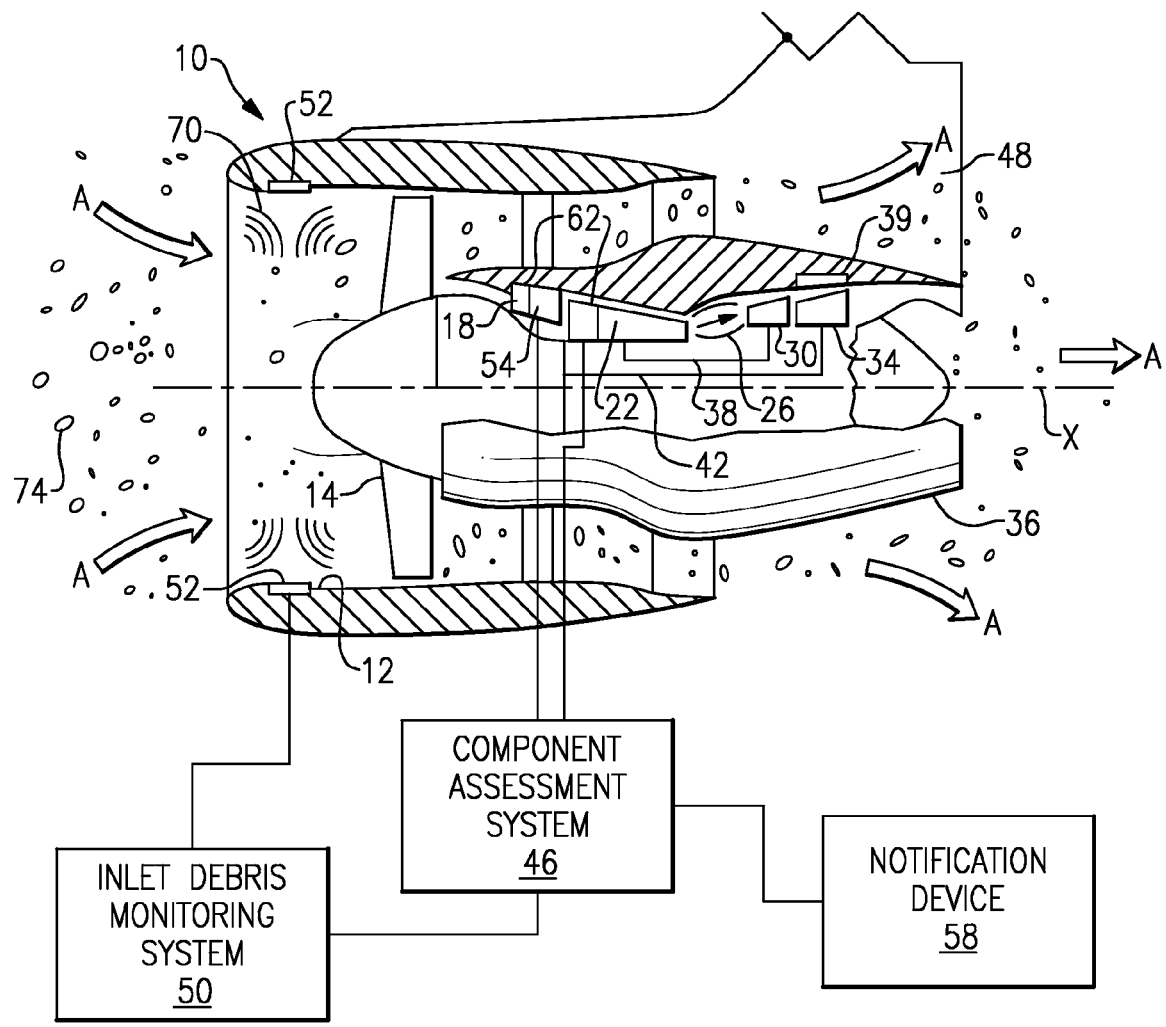
FIG. 1 shows a partial schematic view an example turbofan gas turbine engine and a component assessment system.

FIG. 1 schematically illustrates an example turbofan gas turbine engine 10 including (in serial flow communication) an inlet section 12, a fan section 14, a low-pressure compressor 18, a high-pressure compressor 22, a combustor 26, a high-pressure turbine 30, a low-pressure turbine 34, and a exhaust nozzle section 36. The gas turbine engine 10 is circumferentially disposed about an engine centerline X. During operation, air A is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expanded to produce thrust. As known, the air A moves within gas paths established in the engine 10. Temperature, pressure, and speed of the air A varies depending, for example, on the location of the air within the engine 10.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42. The engine 10 includes a cooling supply system 39 that moves cooling airflow near the turbines 30 and 34 to facilitate thermal energy removal.

The examples described in this disclosure are not limited to the two-spool engine architecture described and may be used in other architectures, such as a single-spool axial design, a three-spool axial design, and a three-spool axial and centrifugal design, and still other architectures.

Figure 2:
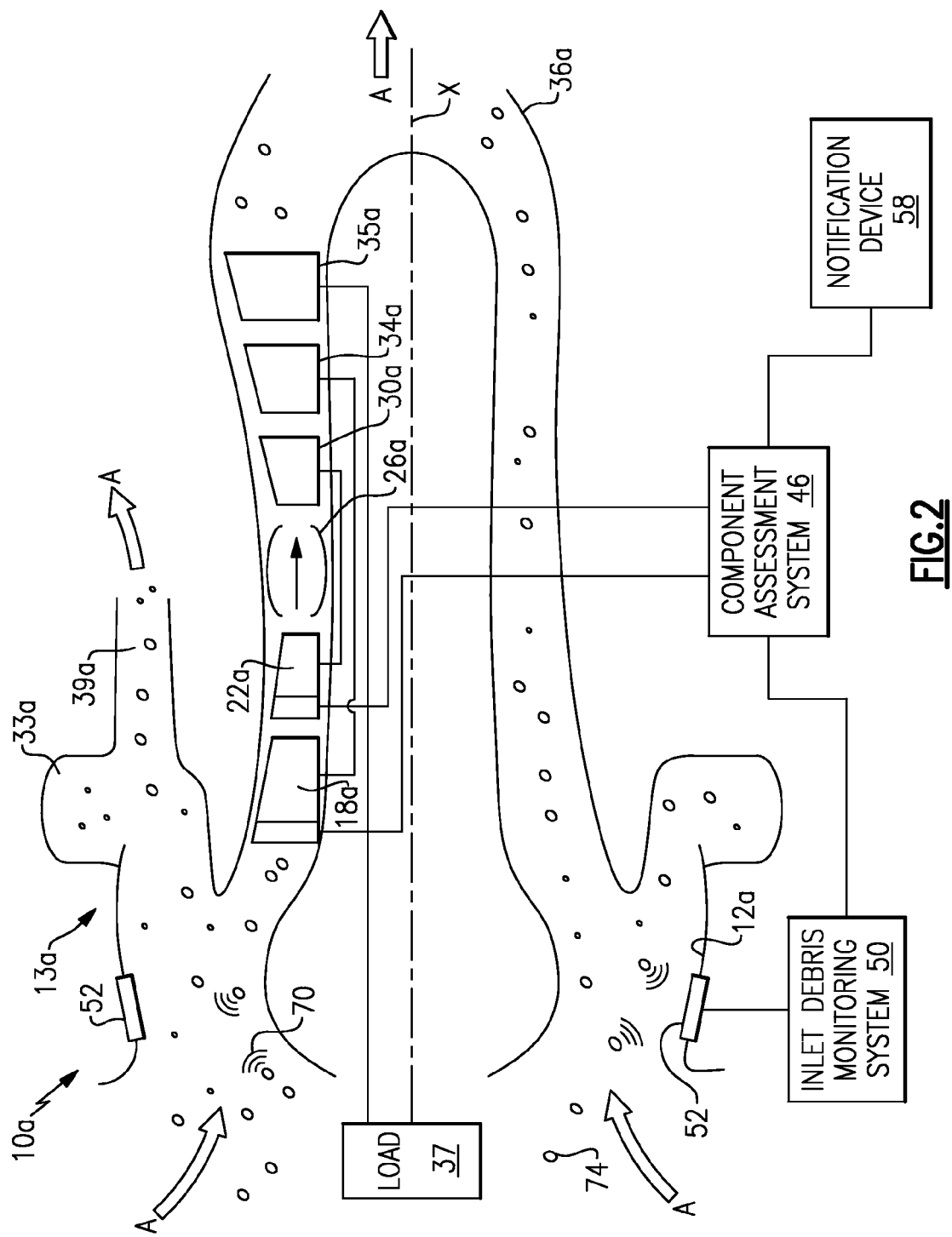
FIG. 2 shows a partial schematic view of an example turboshaft gas turbine engine and the component assessment system.

The examples described are also not limited to the turbofan gas turbine engine 10. For example, FIG. 2 schematically illustrates an example turboshaft gas turbine engine 10a including (in serial flow communication) an inlet section 12a, an inlet particle separator section 13a, a low-pressure compressor 18a, a high-pressure compressor 22a, a combustor 26a, a high-pressure turbine 30a, a low-pressure turbine 34a and a power turbine section 35a. The inlet particle separator section 13a includes an inlet particle separator scroll 33a and a blower 39a as is known. A bypass flow of air moves through the blower 39a in this example.

The turbines 30a and 34a of the gas turbine engine 10a extract energy from the hot combustion gases flowing from the combustor 26a. The residual energy is expanded through the power turbine section 35a to produce output power that drives an external load 37, such as helicopter rotor system. Air is exhausted from the engine 10a at the exhaust nozzle section 36a. There are various types of engines, in addition to the turbofan gas turbine engine 10 of FIG. 1 and the turboshaft gas turbine engine 10a, that could benefit from the examples disclosed herein, which are not limited to the designs shown.

In this example, a component assessment system 46 mounts to an aircraft 48 propelled by the gas turbine engine 10, for example. The component assessment system 46 is in operative communication with an inlet debris monitoring system 50, a plurality of components 54 of the low-pressure compressor 18, a notification device 58, and vanes 62 of the variable vane sections of the low-pressure compressor 18 and the high-pressure compressor 22.

The inlet debris monitoring system 50 receives information from debris detectors 52 that are mounted to the inlet section 12 of the gas turbine engine 10. The debris detectors 52 are configured to measure a static charge 70 from debris 74 carried by the air A that is pulled into the gas turbine engine 10 by the compression section 22. In this example, the debris detectors 52 measure the static charge 70 of debris 74 within the fan section 14. Other examples include debris detectors 52 configured to measure the static charge 70 of debris 74 in other areas, such as forward the fan section 14 or in the low-pressure compressor 22.

The example debris monitoring system 50 provides the component assessment system 46 with at least one characteristic of the debris 74. For example, the debris monitoring system 50 can quantify the amount of debris 74 entering the gas turbine engine 10 based on a level of the static charge 70. Other determinable characteristics include the type of the debris 74 carried by the air A. Sand is one example type of the debris 74. A person skilled in the art and having the benefit of this disclosure would be able to quantify the debris 74 or determine other characteristics of the debris 74 using the debris monitoring system 50.

In this example, the plurality of components 54 of the low-pressure compressor 18 are the blades of the low-pressure compressor 18. The example component assessment system 46 uses the characteristics of the debris 74 and other information to establish an estimated thermal energy level for one or more of the plurality of components. An appropriate timeframe for performing a maintenance action (e.g., component inspection, component repair, component replacement, etc.) on the plurality of components 54 is then established. The component assessment system 46 notifies a technician, for example, that the components 54 should be inspected by providing a notification through the notification device 58.

The vanes 62 are adjustable relative to flow of air through the gas turbine engine 10. Pneumatic or hydraulic actuators typically actuate the vanes 62 based on a schedule. Operating the gas turbine engine 10 with the vanes 62 in some positions lowers the impact of the debris 74 on the gas turbine engine 10, which can advantageously increase the time period before repair, replacement, or inspection is necessary. For example, repositioning the vanes 62 more open relative to the nominal baseline vane schedule may make the debris 74 less likely to block flow from cooling holes of the components 54. Changing the positions of other types of variable position components can also lower the impact of the debris 74 on the gas turbine engine 10.

The example component assessment system 46 adjusts the vanes 62 in response to the characteristics of the debris 74. In this example, the component assessment system 46 adjusts the vanes 62 when the debris detectors 52 detect that the compression section 18 is pulling large amounts of the debris 74 into the gas turbine engine 10. A sandy desert is one example of an environment likely to result in a large amount of the debris 74 entering the gas turbine engine 10. In other examples, the component assessment system 46 adjusts other variable position components of the gas turbine engine 10 to positions for example more open relative to baseline schedule that lower the impact of the debris 74 on the gas turbine engine 10.

Figure 3:
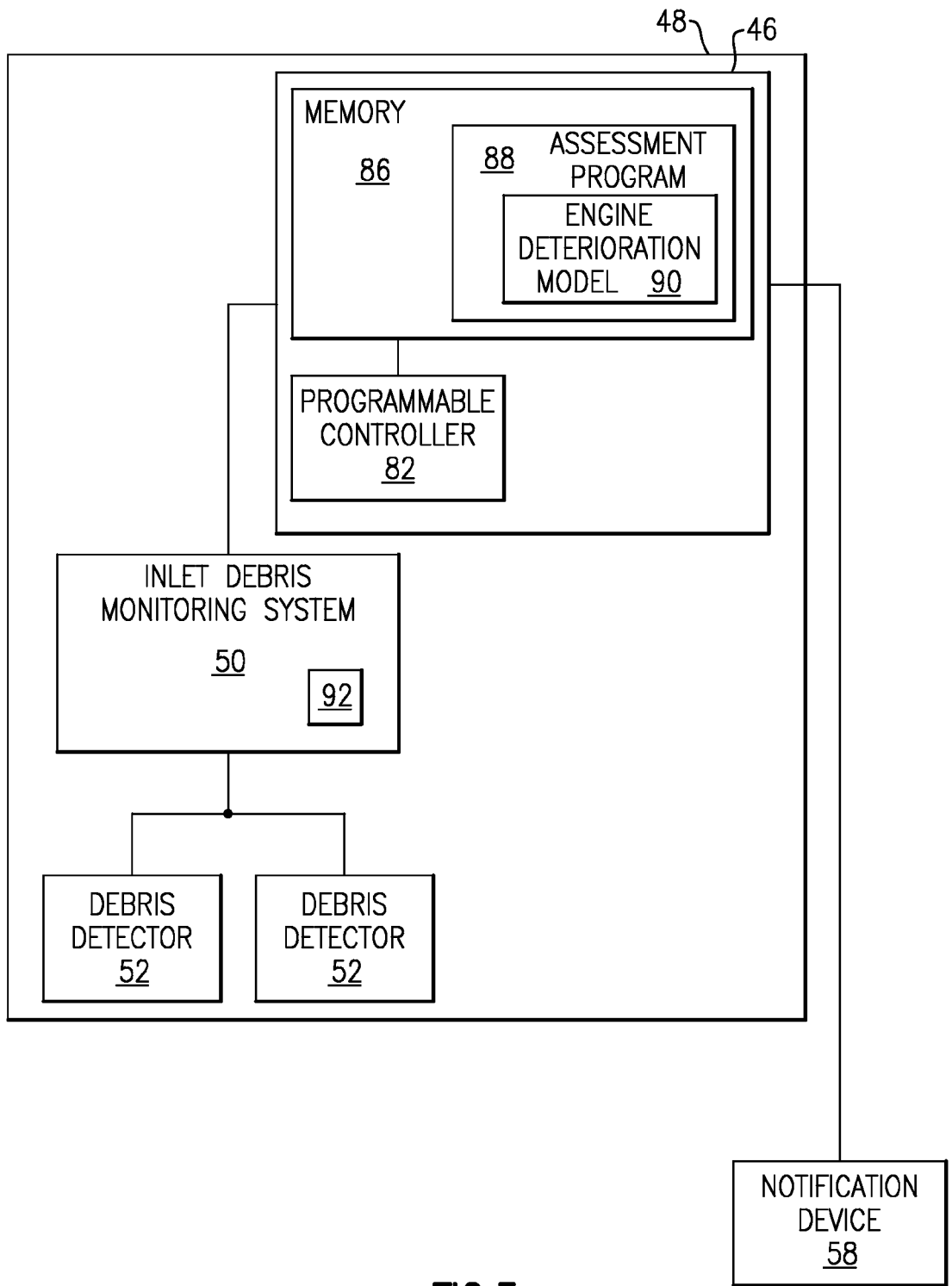
FIG. 3 shows a schematic view of the example component assessment system of FIG. 1.
Figure 4:
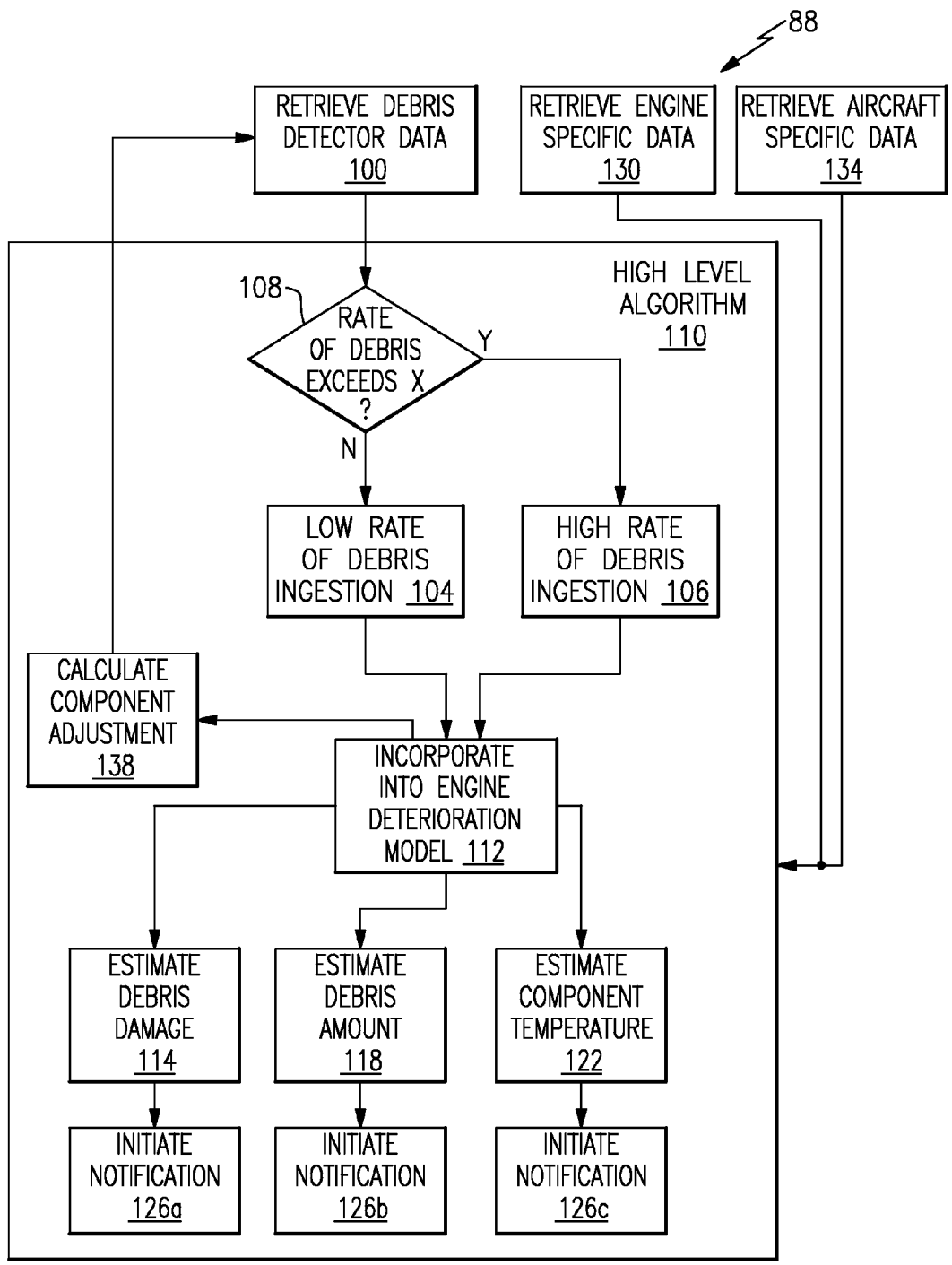
FIG. 4 schematically shows the flow of an example program for the component assessment system of FIG. 1.

Referring now to FIGS. 3 and 4 with continuing reference to FIGS. 1 and 2, the example component assessment system 46 includes a programmable controller 82 and a memory portion 86. The example programmable controller 82 is programmed with an assessment program 88 having an engine deterioration model 90 that facilitates establishing the appropriate timeframe for the periodic inspection. In this example, the inlet debris monitoring system 50 includes a signal conditioning unit 92 that converts static charge measurement from the debris detectors 52 into a DC millivolt measurement and converts it to estimates of the quantity and quality of the debris which it then provides to the assessment program 88. The assessment program 88, a type of computer program, uses this data when estimating thermal energy levels of the components 54 of the engine 10.

The component assessment system 46, a type of computing device, is configured to initiate a notification through the notification device 58 in response to the estimated thermal energy levels. In this example, the notification device 58 is located remote from the aircraft 48. In another example, the notification device 58 is mounted to the aircraft 48. The notification indicates that the components 54 have likely experienced significant thermal energy levels.

It should be noted that many computing devices can be used to implement various functionality, such as incorporating the characteristics of the debris 74 detected by the debris detectors 52 into the engine deterioration model 90 of the component assessment system 46. In terms of hardware architecture, such a computing device can include a processor, the memory portion 86, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor or controller 82 may be a hardware device for executing software, particularly software stored in the memory portion 86. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 86 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 86 may include the assessment program 88 and one or more additional separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory portion 86, to communicate data to and from the memory portion 86, and to generally control operations of the computing device pursuant to the software. Software in memory, in whole or in part, is read by the processor, perhaps buffered within the processor, and then executed.

An example flow of the assessment program 88 includes a step 100 of retrieving the debris data from the inlet debris monitoring system 50, which is then provided to a high level algorithm 110. In one example, a low level algorithm (not shown) calculates the rate and type of the debris 74 entering the engine 10 and provides this debris data to the high level algorithm 110.

If the rate of the debris 74 does not exceed a value X in the step 108, the assessment program 88 progresses to the low rate of debris ingestion leg 104 of the high level algorithm 110, which estimates thermal energy based on a low rate of debris ingestion. If the rate of the debris 74 exceeds the value X in the step 108, the assessment program 88 progresses to a high rate of debris ingestion leg 106 of the high level algorithm 110, which estimates thermal energy based on a high rate of debris ingestion. In one example, the step 108 moves to the high rate of ingestion leg 106 after determining that the engine 10 is ingesting more than one pound of sand per hour, and that the sand has a particular composition. The value X in such an example is thus one pound of sand that has the particular composition. The high level algorithm 128 moves to the low rate leg 120 when sand ingestion is below the value X to estimate thermal energy for example.

The high level algorithm 110 includes a step 112 of incorporating the debris data into the engine deterioration model 90. The high level algorithm 110 utilizes the data from the step 108 to establish many types of information about the components 54 of the engine 10. The engine deterioration model 90 uses the debris data provided by the inlet debris monitoring system 50 with the measured gas path parameters to calculate the information about the components 54 based on historical degradation speeds and temperatures, for example.

In one example, the engine deterioration model 90 initiates a notification on the notification device 58 after estimating that the components 54, which are superalloy turbine vanes, have reached a temperature of more than 1900° F. In this example, the notification device 58 is apart from the aircraft 48. In another example, the notification device 58 is inside the aircraft 48.

For example, a step 114 estimates if the debris 74 would cause enough damage to the components 54 to increase thermal energy levels within the components. If so, the step 114 initiates a notification at a step 126a on the notification device 58.

A step 118 estimates a level of damage to the components 54 caused by increased thermal energy levels. The estimate is based on the amount and type of the debris 74. The step 118 then initiates a notification at a step 126b that displays the estimated level of damage to the components 54.

A step 122 estimates the actual thermal energy in one or more of the components 54. The estimated thermal energy level is based on the debris 74 that have entered the engine 10. The estimated thermal energy level is related to an estimated temperature of a metal portion of the components 54, for example. The step 122 initiates a notification at a step 126c if the estimated thermal energy level corresponds to a set thermal energy value, which is a level of thermal energy that would damage the components 54 if increased. Initiating the notification at the step 126c when the estimated thermal energy level corresponds to the set thermal energy value notifies a technician to perform maintenance on the components 54 before the components 54 are damaged by thermal energy, for example.

In this example, each notification initiated at the steps 126a, 126b, 126c is different. For example, the notification initiated at the step 126a is a flashing light type notification whereas the notification initiated at the step 126b is a visual display of the total amount of the debris 74.

In another example, the high level algorithm 110 includes steps initiating notifications based on the size of the debris 74 moving through the engine 10. For example, a notification associated with fine debris may trigger an assessment of thermal energy levels of the components 54, whereas a notification associated with course debris triggers another type of assessment.

The example high level algorithm 110 and particularly the engine deterioration model at the step 112 utilizes additional data to determine whether to initiate the notifications at the steps 126a, 126b, 126c. For example, a step 130 provides the high level algorithm 110 with engine specific data, such as engine speeds, engine pressures, etc. A step 134 provides the high level algorithm 110 aircraft specific data, such as flight speeds, flight altitudes, etc. In some examples, the high level algorithm 110 initiates notifications using the amount of component life used, the available power levels, etc.

A technician observing the notifications initiated at the steps 126a, 126b, 126c, often performs maintenance on the component 54 of the engine 10 in response. In one example, the technician observes the notification initiated at the step 126c and then removes the components 54 from the engine 10. The technician then boroscopes sections of the components 54 to determine their structural integrity. Other maintenance actions include washing the components 54.

At a step 138, the high level algorithm 110 calculates and initiates adjustments to variable position components of the engine. The high level algorithm 110 initiates changes in the positions of variable position components within the engine 10 to lower the impact of the debris on the components, for example.

Features of the disclosed embodiments include estimating thermal energy within gas turbine engine components and adjusting the estimates based on the debris entering the engine.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of assessing a component of a gas turbine engine comprising:
   monitoring debris in at least a portion of an engine;
   determining a characteristic of the debris; and
   establishing an estimated thermal energy level for a component of the engine based on the characteristic of the debris.

2. The method of claim 1 including initiating a notification based on the estimated thermal energy level.

3. The method of claim 1 including performing a maintenance action on the component when the estimated thermal energy level corresponds to a set value.

4. The method of claim 1 wherein the monitoring includes quantifying the debris.

5. The method of claim 1 including establishing the estimated thermal energy level using an engine deterioration model.

6. The method of claim 1 including adjusting the component or another component of the engine to lower the estimated thermal energy level.

7. The method of claim 6 wherein the adjusting includes actuating a plurality of compressor variable vanes.

8. The method of claim 7, including actuating the plurality of compressor variable vanes to be more open relative to a nominal baseline vane schedule.

9. The method of claim 6 wherein the adjusting comprises increasing turbine cooling flows through modulation of cooling flow supply system.

10. The method of claim 1 wherein the estimated thermal energy level for the component comprises an estimated metal temperature of the component.

11. The method of claim 1, including adjusting during operation of the engine.

12. A method of assessing components of a gas turbine engine comprising:
    monitoring airflow moving through a portion of an engine to detect a presence of debris carried by the airflow;
    determining a characteristic of the debris;
    initiating a notification relating to an estimated temperature of a component of the engine based at least in part on the characteristic; and
    adjusting the component or another component of the engine in response to the characteristic to change the estimated temperature.

13. The method of claim 12 wherein the characteristic comprises an amount of debris.

14. The method of claim 12 wherein the characteristic comprises a type of debris.

15. The method of claim 12, wherein the adjusting occurs during operation of the engine during flight.

16. The method of claim 12, including adjusting the component or another component of the engine to be more open relative to a baseline schedule.

17. A gas turbine engine component assessment system comprising:
    a debris monitoring system configured to monitor debris moving through a portion of an engine; and
    a controller programmed to execute an engine deterioration model that assesses an estimated thermal energy level of at least one component of the engine based on a characteristic of the debris provided by the debris monitoring system.

18. The system of claim 17 including a notification device, the controller programmed to initiate a notification of the notification device if the estimated thermal energy level corresponds to a set value.

19. The system of claim 17, including an adjustable component of the engine, the controller configured to initiate adjustments to the adjustable component in response to the assessed thermal energy level.

20. The system of claim 17, wherein the adjustments are initiated during operation of the engine during flight.

* * * * *